United States Patent [19]

Kashiwazaki et al.

[11] Patent Number: 5,439,514
[45] Date of Patent: Aug. 8, 1995

[54] INK, PRODUCTION THEREOF, AND INK-JET RECORDING METHOD AND APPARATUS EMPLOYING THE SAME

[75] Inventors: Akio Kashiwazaki, Yokohama; Yuko Suga, Tokyo; Aya Takaide, Yokohama, all of Japan

[73] Assignee: Canon Kabushiki Kaisha, Tokyo, Japan

[21] Appl. No.: 220,445

[22] Filed: Mar. 30, 1994

[30] Foreign Application Priority Data

Apr. 1, 1993 [JP] Japan .................. 5-075891

[51] Int. Cl.$^6$ .................. C09D 11/00; C09D 11/02
[52] U.S. Cl. .................. 106/20 C; 106/404; 106/447
[58] Field of Search .................. 106/20 C, 23 C, 404, 106/447

[56] References Cited

U.S. PATENT DOCUMENTS

| | | | |
|---|---|---|---|
| 4,565,576 | 1/1986 | Salgo et al. | 106/23 |
| 4,604,139 | 8/1986 | Shioi et al. | 106/22 C |
| 4,657,591 | 4/1987 | Shioi et al. | 106/22 C |
| 4,804,411 | 2/1989 | Eida et al. | 106/22 |
| 4,864,324 | 9/1989 | Shirota et al. | 346/1.1 |
| 5,009,536 | 4/1991 | Inoue et al. | 106/20 C |
| 5,085,698 | 2/1992 | Ma et al. | 106/20 |
| 5,160,370 | 11/1992 | Suga et al. | 106/20 |
| 5,172,133 | 12/1992 | Suga et al. | 346/1.1 |
| 5,184,148 | 2/1993 | Suga et al. | 346/1.1 |
| 5,229,786 | 7/1993 | Suga et al. | 346/1.1 |
| 5,281,262 | 1/1994 | Saito | 106/20 R |
| 5,324,349 | 6/1994 | Sano et al. | 106/20 R |

FOREIGN PATENT DOCUMENTS

| | | |
|---|---|---|
| 2515677 | 5/1983 | France . |
| 56-147859 | 11/1981 | Japan . |
| 56-147860 | 11/1981 | Japan . |
| 58-80368 | 5/1983 | Japan . |
| 59-98173 | 6/1984 | Japan . |
| 61-200182 | 9/1986 | Japan . |
| 61-247774 | 11/1986 | Japan . |
| 61-272278 | 12/1986 | Japan . |
| 62-568 | 1/1987 | Japan . |
| 62-91574 | 4/1987 | Japan . |
| 62-101672 | 5/1987 | Japan . |
| 62-106171 | 5/1987 | Japan . |
| 63-145381 | 6/1988 | Japan . |
| 63-218779 | 9/1988 | Japan . |
| 1249869 | 10/1989 | Japan . |
| 1310760 | 12/1989 | Japan . |
| 4-57859 | 2/1992 | Japan . |
| 4-57860 | 2/1992 | Japan . |

OTHER PUBLICATIONS

WPI/Derwent AN 88-364114 for JP-A-63273674, Nov. 1988.
WPI/Derwent AN 92-203861 for JP-A-4132773, May 1992.

*Primary Examiner*—Helene Klemanski
*Attorney, Agent, or Firm*—Fitzpatrick, Cella, Harper & Scinto

[57] ABSTRACT

An ink is provided which contains a pigment and a dispersing agent in an aqueous medium, and further contains at least one fine particulate white inorganic material selected from fine particulate titanium dioxide, and fine particulate alumina. An ink-jet recording method and an ink-jet recording apparatus are also provided.

16 Claims, 3 Drawing Sheets

INK, PRODUCTION THEREOF, AND INK-JET RECORDING METHOD AND APPARATUS EMPLOYING THE SAME

BACKGROUND OF THE INVENTION

1. Field of the Invention

The present invention relates to an ink suitable for ink-jet recording. The present invention also relates to an ink-jet recording method for conducting recording by ejection of the ink through an orifice of a recording head, preferably by action of thermal energy, on paper, and to an apparatus for the recording. The present invention further relates to a process for producing the above ink.

2. Related Background Art

The ink-jet recording system has advantages of less noise generation during recording, and higher recording speed with higher resolution owing to a highly integrated head. The ink-jet recording system usually employs an ink which contains a water-soluble dye dissolved in water or a mixture of water with an organic solvent. The ink containing a water-soluble dye generally has a disadvantage of low light-fastness of recorded images because of the inherent low light-fastness of the water-soluble dye. The water-soluble ink frequently involves problems in water resistance such that the recorded image becomes blurred or flows out when the recorded image is brought into contact with rain, sweat, or drinking water.

On the other hand, stationery utensils using dye such as ball-point pens involve similar problems. For improvement in light-fastness and water resistance of the record, various aqueous pigment-containing inks have been disclosed for stationery utensils. For practical use of an aqueous pigment ink, methods for stabilization of pigment dispersion, prevention of ink solidification at a pen tip, and prevention of abrasion of a ball of a ball-point pen are disclosed, for example, in Japanese Patent Application Laid-Open Nos. 58-80368, 61-200182, 61-247774, 61-272278, 62-568, 62-101671, 62-101672, 1-249869, 1-301760, and so forth. Recently, ball-point pens and felt-tip pens which employ an aqueous pigment ink have come into market.

Ink-jet inks which employ an aqueous pigment ink, a specific water-soluble solvent, and a polymeric dispersing agent are disclosed in Japanese Patent Application Laid-Open Nos. 56-147859, and 56-147860. Inks which employ a pigment and a dye in combination are disclosed in Japanese Patent Application Laid-Open Nos. 4-57859, and 4-57860.

Conventional aqueous pigment inks, however, have disadvantages that quality and density of recorded images deteriorate remarkably depending on the kind of the paper, especially when the images are recorded on plain paper (e.g., copying paper, bond paper, or the like, widely used in offices). This results from the fact that the surface state of the plain paper varies generally depending on the kind of paper, which is different from specially designed ink-jet recording paper. The absorption of ink by paper and feathering of ink on paper depends on the surface state of the paper. With an aqueous dye ink, the printing density, which greatly affects the printing quality, depends less on the surface state of the paper, since the dye is readily fixed by paper fiber on the surface of paper. On the contrary, with an aqueous pigment ink, the printing density depends greatly on the surface state of the paper since the printing density is obtained by retention of the pigment on the surface of the paper. An aqueous pigment ink usually contains an alkali-soluble resin as the a dispersing agent which coheres on the paper surface to increase the printing density. Therefore, with the aqueous pigment ink, the printing density may be deteriorated in printing quality and printing density depending on the kind of paper. One method of improving the quality and density of the printing is to bring the pH of the ink into an acidic range. The acidic state, however, renders the dispersion state unstable to cause low ejection stability, low long-term dispersion stability, solidification at fine nozzle tips, etc., which are serious problems to an ink-jet recording ink. As mentioned above, the printing density and the printing quality cannot be consistent with each other. Although use of a pH-stable resin as a dispersant can solve considerably the above problems that affect the reliability and the dependence of printing density on the kind of paper, it significantly lowers the printing density and the printing quality.

Although the printing quality and the printing density can be improved by raising a solid content in the ink, it impairs greatly the reliability mentioned above.

Furthermore, fixability of pigment is also an important problem of the aqueous pigment ink. The fixability may be improved by use of a combination of a quick-drying organic solvent with a surfactant. However, the printing density and the printing quality are considerably impaired by addition thereof in an amount necessary for satisfactory fixability.

For improving printing density and printing quality of writing tools, addition of fine silica particles is described, for example, in Japanese Patent Application Laid-Open Nos. 59-98173, and 62-91574. This method, however, can give neither satisfactory printing density nor satisfactory printing quality in ink-jet recording. Further, incorporation of spherical resin particles in an ink is disclosed in Japanese Patent Application Laid-Open Nos. 63-145381, and 63-218779. This method, however, cannot give satisfactory results in printing density, printing quality, and reliability in ink-jet printing.

Accordingly, it is desired to improve the printing density and printing quality with satisfactory reliability of the ink-jet recording ink, especially dispersion stability and ejection stability.

SUMMARY OF THE INVENTION

The present invention intends to provide an ink which is free from the aforementioned problems of conventional inks and is capable of giving excellent printing density and printing quality with reliability. The present invention also intends to provide a process for producing the above ink, an ink-jet recording method and an ink-jet recording apparatus employing the above ink.

The ink of the present invention which contains a pigment and a dispersing agent in an aqueous medium, the ink further containing at least one fine particulate white inorganic material selected from fine particulate titanium dioxide, and fine particulate alumina.

The ink-jet recording method of the present invention which conducts recording by ejecting ink in a form of droplets, the ink containing a pigment and a dispersing agent in an aqueous medium, and further containing at least one fine particulate white inorganic material selected from fine particulate titanium dioxide, and fine particulate alumina.

The ink-jet recording apparatus of the present invention is characterized by use of the aforementioned ink.

The process for producing the ink which contains a pigment, and a dispersing agent in an aqueous medium, wherein the pigment, the dispersing agent, and at least one fine particulate white inorganic material selected from fine particulate titanium dioxide and a fine particulate alumina are added simultaneously to the aqueous medium and treated for dispersion.

BRIEF DESCRIPTION OF THE DRAWINGS

FIG. 1A is a sectional view for explaining of an example of constitution of a recording head of the present invention. FIG. 1B is a sectional view of the recording head at the line A–B in FIG. 1A.

DETAILED DESCRIPTION OF THE PREFERRED EMBODIMENTS

Figure 1A:
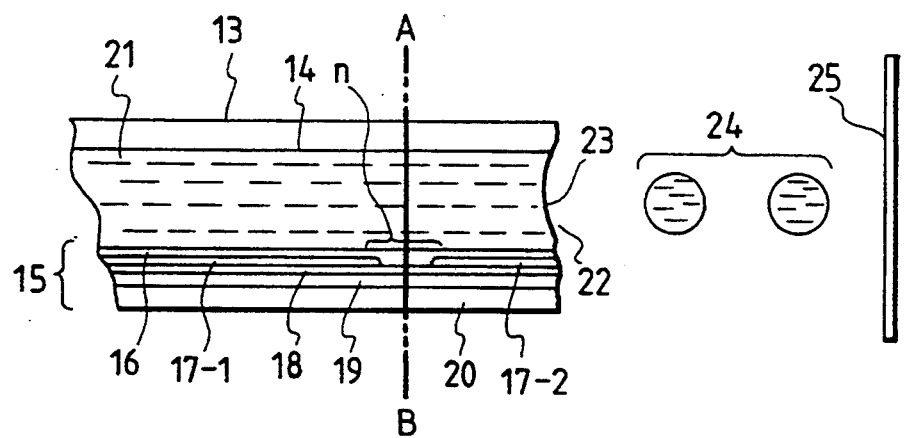
FIGS. 1A and 1B are sectional views of a recording head of the present invention.

In ink-jet recording on plain paper with aqueous pigment ink containing a pigment, printing quality and printing density greatly deteriorate depending on the kind of paper. After comprehensive studies on the causes of the above deterioration, it was found by the inventors of the present invention that the printing quality, and in particular, the printing density, is greatly affected by a surface state of the paper, and completed the present invention. According to the findings, the ejected aqueous pigment ink causes aggregation immediately after reaching the paper surface to remain on the surface to produce print at a certain printing density. Excellent printing density is obtained if the surface state of the paper promotes destruction of the stability of the ink, while intended printing density is not obtainable if penetration of the ink precedes the ink cohesion. The plain paper is classified roughly into acid paper and neutralized paper. The surface state of the paper is generally modified by treatment for respective uses. Therefore, it is difficult to design an ink which begins instantaneously to cause aggregation at a surface of every kind of paper. Furthermore, the design of ink which makes the ink dispersion unstable to increase printing density conflicts with high ejection stability, long-term storage stability, and prevention of solidification at fine nozzle tip after long standing.

It was found by the inventors of the present invention that the above problems are solved simultaneously without changing the dispersing resin by additional incorporation of fine particulate titanium dioxide or fine particulate alumina as a fine particulate inorganic white material into the ink containing a pigment, a dispersing agent, and an aqueous medium. The present invention has been accomplished based on the above findings.

In this method, a quick-drying organic solvent and a surfactant can readily be combinedly used for the ink. Thereby fixability can be improved without impairing printing quality and printing density.

The present invention described below in detail.

The fine particulate titanium dioxide or the fine particulate alumina as the fine particulate white inorganic material is not specially limited in its kind. Any kind thereof is useful provided that it is dispersible stably together with the pigment for ink-jet recording ink. The particle shape is preferably spherical, but is not limited thereto. The surface of the particle may be treated for hydrophilicity or hydrophobicity. Of the aforementioned particulate material, preferably preferred is particulate titanium dioxide having been treated for hydrophilicity. Examples thereof are "Titania Series" manufactured by Idemitsu Kosan K.K.; Titanium Dioxide P25, and Aluminum Oxide C manufactured by Nippon Aerosil K.K.; and the like.

The fine particulate white inorganic material contained in the ink of the present invention has preferably a primary particle diameter in the ratio ranging from 1:10 to 5:1 to the primary particle diameter of the pigment used. Considering the particle diameter of the pigment for ink-jet recording inks, the primary particle diameter of the fine particulate white inorganic material ranges from about 5 to about 200 nm. The diameter in the range of from about 5 to about 100 nm is preferred to satisfy the purpose of the present invention. The fine particulate white inorganic material is preferably contained in a ratio ranging from 1:20 to 1:1 by weight to the pigment. At the content ratio of lower than 1:20 by weight, satisfactory printing quality and printing density are not achievable, while at the content ratio of higher than 1:1, satisfactory reliability in storage stability, ejection stability, etc. are not achievable. The content ratio of from 1:10 to 1:2 is more preferable for attaining sufficiently the objects of the present invention.

The pigment used in the ink of the present invention is contained at a content of from 1 to 20% by weight, preferably 2 to 12% by weight based on the total weight of the ink. Any kind of pigment is useful in the present invention provided that the aforementioned properties are satisfied.

The carbon black useful the black ink may be the one produced by a furnace process, or a channel process; having a primary particle diameter of from 15 to 40 nm, a BEI specific surface area of from 50 to 300 m$^2$/g, a DBP oil absorption of from 40 to 150 ml/100 g, a volatile matter content of from 0.5 to 10%, and pH of from 2 to 9. The examples of carbon black include No. 2300, No. 900, MCF88, No. 33, No. 40, No. 45, No. 52, MA7, MA8, and No. 2200B (respectively, manufactured by Mitsubishi Chemical Industries Ltd.); RAVEN1255 (manufactured by Columbia Co.); REGAL400R, REGAL330R, REGAL660R, and MOGUL L (manufactured by Cabot Co.); Color Black FW1, Color Black FW18, Color Black S170, Color Black S150, Printex 35, and Printex U (manufactured by Degussa Co.), and the like commercial products. The experimentally prepared carbon black for the present invention is also useful.

The pigment for the yellow ink includes C.I. Pigment Yellow 1, C.I. Pigment Yellow 2, Pigment Yellow 3, C.I. Pigment Yellow 13, C.I. Pigment Yellow 16, and C.I. Pigment Yellow 83.

The pigment for the magenta ink includes C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112, and C.I. Pigment Red 122.

The pigment for the cyan ink includes C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, and C.I. Vat Blue 6.

The pigments experimentally prepared for the present invention are also useful.

The dispersing agent for the pigment and fine particulate white inorganic material used in the ink of the present invention may be any water-soluble resin. The resin having a weight-average molecular weight ranging from 500 to 30000, more preferably from 1000 to 15000 is suitable. Specific examples thereof include block copolymers and random copolymers constituted of two or more monomer units selected from styrene and derivatives thereof, vinylnaphthalene and derivatives thereof, aliphatic alcohol esters or like derivatives of an $\alpha,\beta$-ethylenic unsaturated carboxylic acid, and the like; and acrylic acid and derivatives thereof, maleic acid and derivatives thereof, itaconic acid and derivatives thereof, fumaric acid and derivatives thereof; and salts of the copolymers. These resins are alkali-soluble resins which are soluble in an aqueous solution containing a base dissolved therein, and are particularly preferred for an ink-jet recording ink because of the advantages of capability of lowering the viscosity of the liquid dispersion and ease of dispersion formation. Further examples of the dispersing agent include homopolymers constituted of a hydrophilic monomer unit, and salts thereof, including water-soluble resins such as polyvinylpyrrolidone, polyvinyl alcohol, carboxymethyl cellulose, naphthalenesulfonic acid-formaldehyde condensate; and natural resins such as rosin, and shellac. A surface active agent may be used, including polyoxyethylene alkyl ethers and polyoxyethylene alkyl esters. The water-soluble resin and the surface active agent may be added to the ink in an amount of from 0.1 to 5% by weight based on the total weight of the ink.

The ink of the present invention is preferably adjusted to be neutral or alkaline as the whole ink because the solubility of the above water-soluble resin can be increased and the long-term storability can be improved thereby. The pH of the ink is preferably adjusted to be in the range of from 7 to 10 so as not to cause corrosion of the members of the ink-jet recording apparatus.

For adjusting the pH, an pH adjusting agent may be used, including organic amines such as diethanolamine, and triethanolamine, inorganic alkalis such as alkali metal hydroxides, e.g., sodium hydroxide, lithium hydroxide, potassium hydroxide, etc.; organic acids, mineral acids, and so forth.

The pigment, the fine particulate white inorganic material, and the water-soluble resin mentioned above are dispersed or dissolved in an aqueous medium. The aqueous medium in the present invention is a mixture of water with a water-soluble organic solvent, and the water is not ordinary water containing various ions, but is, preferably deionized one.

The water-soluble organic solvent to be mixed with water includes alkyl alcohols having 1 to 4 carbons such as methyl alcohol, ethyl alcohol, n-propyl alcohol, isopropyl alcohol, n-butyl alcohol, s-butyl alcohol, and t-butyl alcohol; amides such as dimethylformamide, and dimethylacetamide; ketones and ketone alcohols such as acetone, and diacetone alcohol; ethers such as tetrahydrofuran, and dioxane; polyalkylene glycols such as polyethylene glycol, and polypropylene glycol; alkylene glycols having 2 to 6 carbons such as ethylene glycol, propylene glycol, butylene glycol, triethylene glycol, 1,2,6-hexanetriol, thioglycol, hexylene glycol, and diethylene glycol; polyhydric alcohols and lower alkyl ether thereof such as glycerol, ethylene glycol monomethyl (or ethyl) ether, and diethylene glycol monomethyl (or ethyl) ether; and N-methyl-2-pyrrolidone, 2-pyrrolidone, 1,3-dimethyl-2-imidazolidinone, and the like. Of these water-soluble organic solvents, preferred are polyhydric alcohols like diethylene glycol and lower alkyl ethers of polyhydric alcohols like triethylene glycol monomethyl (or ethyl) ether.

Addition of ethanol, isopropyl alcohol, or a lower alkyl ether of a polyhydric alcohol to the ink is effective for stabilization of liquid droplet ejection. Such a solvent will stabilize the bubbling of the recording liquid on a thin film resistance heater.

The aforementioned water-soluble organic solvent is added to the ink of the present invention in an amount of generally from 3 to 50% by weight, preferably from 3 to 40% by weight based on the total weight of the ink. The water is added in an amount of from 10 to 90% by weight, preferably from 30 to 80% by weight based on the total weight of the ink.

The ink of the present invention may contain, in addition to the above components, a further additive such as a surfactant, an antifoaming agent, an antiseptic agent, a commercial water-soluble dye, and the like, if necessary.

The surfactant is not limited to the ones mentioned above, but is of any type provided that it does not adversely affect the properties, such as storage stability, of the ink. The surfactant includes anionic surfactants such as fatty acid salts, higher alcohol sulfate ester salts, liquid fatty oil sulfate ester salts, and alkylarylsulfonate salts; and nonionic surfactants such as polyoxyethylene alkyl ethers, polyoxyethylene alkyl esters, polyoxyethylene sorbitan alkyl ethers, acetylene alcohol, and acetylene glycol. One or more of the above surfactants may be suitably selected. The amount of the surfactant to be used depends on the kind and the amount of the dispersing agent, and may be in the range of from 0.01 to 5% by weight based on the total weight of the ink. The amount of the surfactant is adjusted preferably to obtain the surface tension of the ink of 30 dyn/cm or higher, since the surface tension lower than this of the recording liquid causes disadvantages such as deviation of ink-shooting points owing to wetting of the nozzle tip.

The ink of the present invention may be prepared by adding a pigment and a fine particulate white inorganic material to an aqueous solution containing at least a dispersing resin and water, stirring the mixture, dispersing the solid components with the dispersion means mentioned later to obtain a desired liquid dispersion, adding the aforementioned additive or additives to the obtained dispersion, and stirring the resulting mixture to obtain an ink. When an alkali-soluble resin is used, a base needs to be added to dissolve the resin.

The aqueous solution containing the pigment and the fine particulate white inorganic material before the dispersing treatment is preferably subjected to premixing treatment for 30 minutes or longer. This premixing treatment improves the wettability of the surface of the pigment and the fine particulate white inorganic material, and promotes adsorption on the surface of the pigment.

The alkaline substance to be added to the liquid dispersion to solve an alkali-soluble resin includes organic amines such as monoethanolamine, diethanolamine, triethanolamine, and aminomethylpropanol; ammonia; and inorganic bases such as potassium hydroxide, and sodium hydroxide.

The dispersion means to be used in the present invention may be any dispersion machine used generally, including ball mills, roll mills, and sand mills. Of these machines, preferred are high speed sand mills such as Super Mill, Sand Grinder, Beads Mill, Agitator Mill, Grain Mill, Daino Mill, Pearl Mill, and Cobol Mill (all being trade names).

To obtain a desired particle size distribution of the dispersion of the pigment and the fine particulate white inorganic material, a measure or measures are taken such as decrease of the size of the grinding media, increase of the filling ratio of the grinding media, increase of the length of treating time, decrease of the discharge speed, and classification of the particles by filtering or centrifuging after the grinding, and so forth, or combination of the above measures.

The suitable recording apparatus for recording with the ink of the present invention is exemplified by an apparatus which ejects liquid droplets by thermal energy given to a recording liquid in a chamber of a recording head in accordance with recording signals.

Figure 1B:
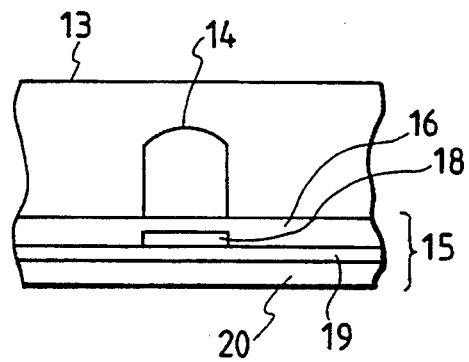
Figure 2:
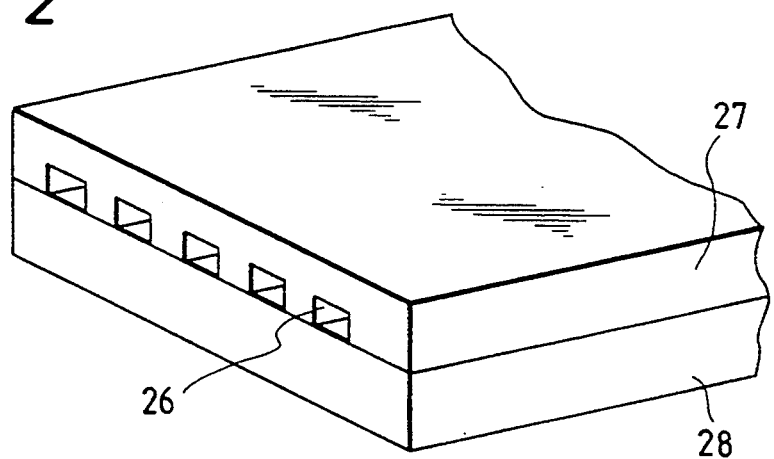
FIG. 2 is a perspective view of a multiple head having a plurality of heads of FIG. 1A in juxtaposition.

An example of the construction of a head which is the essential part of the apparatus is shown in FIGS. 1A, 1B, and 2.

FIG. 1A is a sectional view along an ink flow path of an example of a recording head 13 for explanation of the construction of the head.

FIG. 1B is a sectional view of the recording head at the line A–B in FIG. 1A.

FIG. 2 is a perspective view of a multiple head having a plurality of heads of FIG. 1A in juxtaposition.

Figure 3:
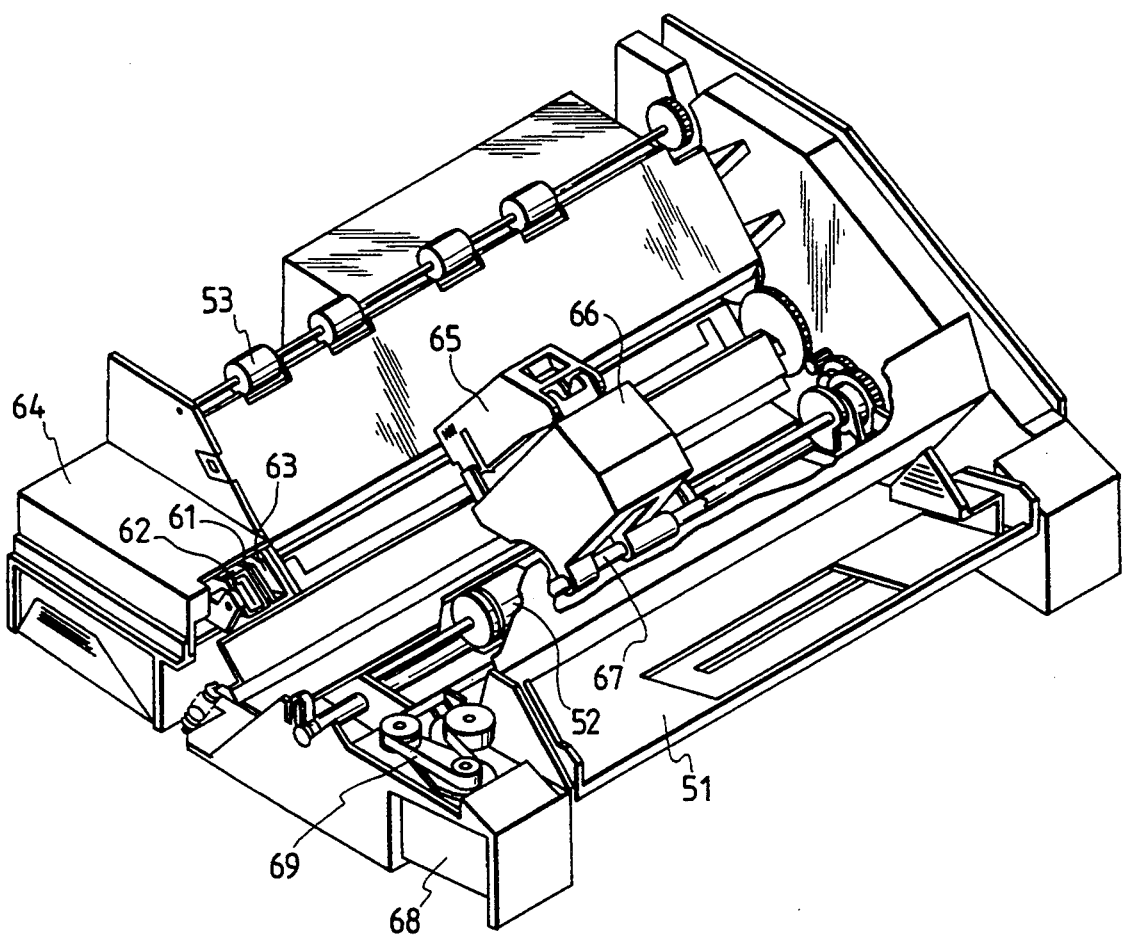
FIG. 3 is a perspective view of an ink-jet recording apparatus having the head of the present invention mounted thereon.

FIG. 3 is a perspective view of an ink-jet recording apparatus having the head of the present invention mounted thereon.

In FIGS. 1A and 1B, the head 13 is constructed by bonding a plate of glass, ceramics, or plastics having grooves 14 for ink flow with a heat-generating head 15 for thermal recording. (The heat-generating head is not limited to the thin film head shown in the drawing.) The heat-generating head 15 is constituted of a protection layer 16 formed of silicon oxide or the like, aluminum electrodes 17-1, 17-2, a heat-generating resistance layer 18 made of nichrome or the like, a heat-accumulating layer 19, and a heat-radiating substrate plate 20 made of alumina or the like.

The ink 21 fills an ejection orifice (fine nozzle) 22, and has a meniscus 23 formed by a pressure P.

On application of an electric signal information to the electrodes 17-1, 17-2 of the head, the region denoted by a symbol "n" on the heat-generating head 15 generates heat abruptly to form bubbles in the ink 21 on the region, the pressure of the bubble pushes out the meniscus 23 to eject the ink 21 from the orifice 22 in a shape of droplets 24. The ejected ink droplets travel toward a recording medium 25.

The multiple head shown in FIG. 2 is formed by bonding a glass plate 27 having multiple grooves 26 with the heat-generating head 28 like the one shown in FIG. 1A.

In FIG. 3, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude into the moving path of the recording head. The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head in a manner similar to that of the blade 61. The blade 61, the cap 62, and the absorbent 63 constitute an ejection recovery device 64. The blade 61, and the absorbent 63 serve to remove off water, dust, and the like from the face of the ink ejection nozzle. A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position opposing to the ejection nozzle face of the recording head, and the recording medium is delivered with the progress of the recording to a paper discharge device provided with paper-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head 65 is wiped also in this movement. The recording head is moved to the home position not only at the completion of the recording and at the time of ejection recovery, but is also moved at a predetermined intervals during recording from the recording region. The nozzle is wiped by such movement.

Figure 4:
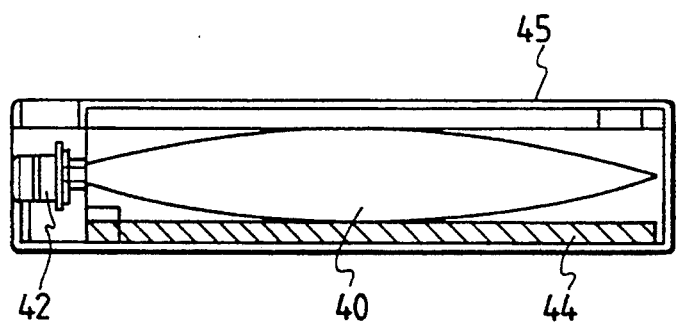
FIG. 4 is a sectional view of an ink cartridge for supplying an ink through an ink-supplying tube to the above head.

FIG. 4 is a sectional view of an example of the ink cartridge 45 which holds an ink to be supplied through an ink supplying member such as a tube. The ink container 40, an ink bag, contains an ink to be supplied, and has a rubber plug 42 at the tip. Insertion of a needle (not shown in the drawing) into the plug 42 enables supply of the ink from the ink bag 40. A waste-ink absorbent 44 serves to absorb a waste ink.

Figure 5:
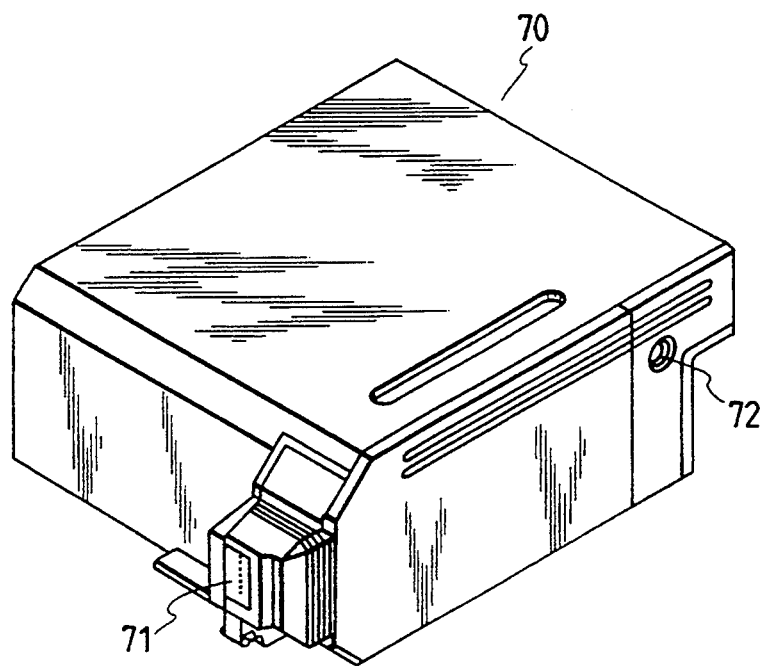
FIG. 5 is a perspective view of an ink-jet cartridge in which the head and the ink tank are integrated.

The ink-jet recording apparatus used in the present invention is not limited to the above-mentioned one which has separately a head and an ink cartridge. Integration thereof as shown in FIG. 5 may suitably be employed. In FIG. 5, a recording unit 70 houses an ink holding member such as an ink absorbent, and the ink in the absorbent is ejected from a plurality of orifices of a head 71. The ink absorbent is made preferably of polyurethane, cellulose, or polyvinyl acetal. An air-communication opening 72 is provided to communicate interior of the cartridge with the open air. The recording unit 70 may be used in place of the recording head 65 shown in FIG. 3, and is made to be readily mountable to and demountable from the carriage 66.

The present invention is described more specifically below by reference to Examples. In Examples the unit "parts" is based on weight.

EXAMPLE 1

(Preparation of Ink)

Preparation of Pigment Liquid Dispersion

The components below were mixed, and heated to 70° C. in a water bath to dissolve the resin completely.

| | |
|---|---|
| Styrene-acrylic acid-butyl acrylate copolymer (acid value: 116, weight-average molecular weight: 3700): | 1.5 parts |
| Monoethanolamine: | 1 part |
| Deionized water: | 79 parts |
| Diethylene glycol: | 5 parts |

To this solution, were added 10 parts of experimentally prepared carbon black (MCF88, made by Mitsubishi Chemical Industries Ltd., primary particle diameter: 18 nm), 2.5 parts of surface treated titanium dioxide (DS-4, manufactured by Idemitsu Kosan K.K., primary particle diameter: 17 nm), and 1 part of isopropyl alcohol. The mixture was premixed for 30 minutes, and then treated for dispersion under the conditions below:

Dispersion machine: Sand Grinder (made by Igarashi Kikai K.K.)
Grinding media: Zirconium beads (1 mm diameter)
Filling ratio of Grinding media: 50% (by volume)
Grinding time: 3 Hours The dispersion was subjected to centrifuge treatment (12000 rpm, 20 minutes) to remove coarse particles to obtain the intended liquid dispersion.

(Preparation of Ink)

The components below were mixed and the pH was adjusted to be in the range of 8 to 10 with monoethanolamine.

| | |
|---|---|
| Liquid dispersion prepared above: | 30 parts |
| Glycerol: | 2 parts |
| Diethylene glycol: | 15 parts |
| N-Methylpyrrolidone: | 5 parts |
| Isopropyl alcohol: | 3 parts |
| Emulbon T-83 (organic boron type surfactant made by Toho Chemical Industry Co., Ltd): | 0.5 part |
| Deionized water: | 44.5 parts |

The ink prepared as described above was tested by use of an ink-jet recording apparatus having an on-demand type of multiple recording head which ejects ink by giving thermal energy to the ink in accordance with information signals.

EXAMPLE 2

(Preparation of Ink)

Preparation of Pigment Liquid Dispersion

The components below were mixed, and heated to 70° C. in a water bath to dissolve the resin completely.

| | |
|---|---|
| Styrene-maleic acid-maleic acid half ester copolymer (acid value: 200, weight-average molecular weight: 12000) | 4 parts |
| Aminomethylpropanol | 2 parts |
| Deionized water | 71 parts |
| Diethylene glycol | 5 parts |

To this solution, were added 15 parts of experimentally prepared carbon black (MCF88, made by Mitsubishi Chemical Industries Ltd., primary particle diameter: 18 nm), and 3 parts of surface treated titanium dioxide (DS-4, manufactured by Idemitsu Kosan K.K., primary particle diameter: 17 nm). The mixture was premixed for 30 minutes, and then treated for dispersion under the conditions below:

Dispersing machine: Pearl Mill (made by Ashizawa K.K.)
Grinding media: Glass beads (1 mm diameter)
Filling ratio of grinding media: 50% (by volume)
Discharge rate: 100 ml/min The dispersion was subjected to centrifuge treatment (12000 rpm, 20 minutes) to remove coarse particles to obtain the intended liquid dispersion.

(Preparation of Ink)

The components below were mixed and the pH was adjusted to be in the range of 8 to 10 with aminomethylpropanol.

| | |
|---|---|
| Liquid dispersion prepared above: | 20 parts |
| Glycerol: | 8 parts |
| Ethylene glycol: | 5 parts |
| Ethanol: | 5 parts |
| Deionized water: | 62 parts |

The ink prepared as described above was tested by use of an ink-jet recording apparatus having an on-demand type of multiple recording head which ejects ink by giving thermal energy to the ink in accordance with information signals.

EXAMPLE 3

An ink was prepared in the same manner as in Example 1 except that Mogul L (manufactured by Cabot Co., primary particle diameter: 24 nm) was used in place of the carbon black. The ink thus prepared was tested by use of an ink-jet recording apparatus having an on-demand type of multiple recording head which ejects ink by giving thermal energy to the ink in accordance with information signals.

EXAMPLE 4

An ink was prepared in the same manner as in Example 1 except that the fine particulate white inorganic material was changed to surface treated titanium dioxide (IT-PC made by Idemitsu Kosan K.K., primary particle diameter: 60 nm). The ink thus prepared was tested by use of an ink-jet recording apparatus having an on-demand type of multiple recording head which ejects ink by giving thermal energy to the ink in accordance with information signals.

EXAMPLE 5

An ink was prepared in the same manner as in Example 1 except that the fine particulate white inorganic material was changed to fine particulate alumina (Aluminum Oxide C, made by Nippon Aerosil K.K., primary particle diameter: 13 nm). The ink thus prepared was tested by use of an ink-jet recording apparatus having an on-demand type of multiple recording head which ejects ink by giving thermal energy to the ink in accordance with information signals.

EXAMPLE 6

(Preparation of Ink)

Preparation of Pigment Liquid Dispersion

The components below were mixed, and heated to 70° C. in a water bath to dissolve the resin completely.

| | |
|---|---|
| Rome D (sodium naphthalenesulfonate, manufactured by San Nobuco Co.): | 1.5 parts |
| Deionized water | 79.5 parts |
| Ethylene glycol | 5 parts |

To this solution, were added 11 parts of experimentally prepared carbon black (S170, made by Degussa Co., primary particle diameter: 17 nm), 2 parts of surface treated titanium dioxide (DS-4, manufactured by Idemitsu Kosan K.K., primary particle diameter: 17 nm), and 1 part of isopropyl alcohol. The mixture was premixed for 60 minutes, and then treated for dispersion under the conditions below:

Dispersion machine: Sand Grinder (made by Igarashi Kikai K.K.)
Grinding media: Zirconium beads (0.5 mm diameter)
Filling ratio of grinding media: 70% (by volume)
Grinding time: 10 hours The dispersion was subjected to centrifuge treatment (12000 rpm, 20 minutes) to remove coarse particles to obtain the intended liquid dispersion.

(Preparation of Ink)

The components below were mixed and the pH was adjusted to be in the range of 8 to 10 with monoethanolamine.

| | |
|---|---|
| Liquid dispersion prepared above: | 30 parts |
| Glycerol: | 12 parts |
| Diethylene glycol: | 15 parts |
| 2-Pyrrolidone: | 5 parts |
| Isopropyl alcohol: | 3 parts |
| Acetylenol EH (made by Kawaken Fine Chemical Industry Co., Ltd): | 0.3 part |
| Deionized water: | 34.7 parts |

The ink prepared as described above was tested by use of an ink-jet recording apparatus having an on-demand type of multiple recording head which ejects ink by giving thermal energy to the ink in accordance with information signals.

Comparative Examples 1–3

The ink was prepared and tested in the same manner respectively as in Examples 1 to 3 except that the fine particulate white inorganic material was not used and deionized water was used in place thereof in preparation of the ink.

Comparative Example 4

An ink was prepared and tested in the same manner as in Example 6 except that the fine particulate white inorganic material was not used and deionized water was used in place thereof in preparation of the ink.

Comparative Example 5

An ink was prepared and tested in the same manner as in Example 1 except that 2.5 parts (as solid matter) of methyl methacrylate type fine particulate material (ME 1000 cf made by Sohken Kagaku K.K., primary particle diameter: 450 nm, water dispersion) was used in place of the fine particulate white inorganic material in preparation of the ink.

Comparative Example 6

An ink was prepared and tested in the same manner as in Example 1 except that the fine particulate white inorganic material was not used and deionized water was used in place thereof, and the amount of the liquid dispersion was changed to 60 parts in preparation of the ink.

The results of the evaluation (Evaluations 1, 2, and 3) are shown in Table 1.

Evaluation 1: Printing density

Printing was conducted on Xerox 4024 copying paper sheets, and Canon NP-DRY copying paper sheets by means of the aforementioned ink-jet recording apparatus, and the density of the print was measured by MacBeth densitometer (TR918).

Evaluation 2

Printing was conducted continuously with the aforementioned ink-jet recording apparatus, and the number of the printed paper sheets before failure of ink ejection occurred was checked.

Evaluation 3: Storage stability

The aqueous pigment ink was placed in a tightly closed glass bottle, and stored at 60° C. for 3 months. When any abnormality such as aggregation of the pigment particles and increase of the viscosity was observed during the storage, the ink was rated as "Poor", and when no abnormality was observed, the ink was rated as "Good".

As described above, the ink-jet recording method of the present invention, employed in an ink-jet printer utilizing thermal energy, gives fastness properties of the resulting print and enables stable ink ejection independently of variation of driving conditions for long time, thus Giving high printing quality and high printing density on any kind of plain paper with high reliability. The ink of the present invention is satisfactory in long-term storage stability.

TABLE 1

TEST RESULTS

| | Evaluation 1 Printing Density | | Evaluation 2 Number of printed sheet before ejection failure | Evaluation 3 Storage stability |
|---|---|---|---|---|
| | Xerox 4024 | NP-DRY | | |
| Examples | | | | |
| 1 | 1.3 | 1.42 | No failure at 500th sheet | Good |
| 2 | 1.3 | 1.4 | No failure at 500th sheet | Good |
| 3 | 1.34 | 1.48 | No failure at 500th sheet | Good |
| 4 | 1.29 | 1.39 | No failure at 500th sheet | Good |
| 5 | 1.28 | 1.35 | No failure at 500th sheet | Good |
| 6 | 1.18 | 1.27 | No failure at | Good |

TABLE 1-continued

| | TEST RESULTS | | |
|---|---|---|---|
| Evaluation 1 Printing Density | | Evaluation 2 | Evaluation 3 |
| Xerox 4024 | NP-DRY | Number of printed sheet before ejection failure | Storage stability |
| Comparative Examples | | | |
| 1 | 1.05 | 1.26 | No failure at 500th sheet | Good |
| 2 | 1.02 | 1.21 | No failure at 500th sheet | Good |
| 3 | 1.07 | 1.28 | No failure at 500th sheet | Good |
| 4 | 0.85 | 1.07 | No failure at 500th sheet | Good |
| 5 | 1.11 | 1.28 | Failure at 200th sheet | Good |
| 6 | 1.18 | 1.31 | Failure at 100th sheet | Poor |

What is claimed is:

1. An ink which contains a pigment and a dispersing agent in an aqueous medium, the ink further containing at least one fine particulate white inorganic material selected from the group consisting of fine particulate titanium dioxide and fine particulate alumina, wherein the ratio of primary particle diameter of the fine particulate white inorganic material to primary diameter of the pigment ranges from 1:10 to 5:1.

2. The ink according to claim 1, wherein primary particle diameter of the fine particulate white inorganic material ranges from 5 to 100 nm.

3. The ink according to claim 1, wherein the ratio of the content of the fine particulate white inorganic material to the content of the pigment ranges from 1:20 to 1:1 by weight.

4. The ink according to claim 1, wherein the ratio of the content of the fine particulate white inorganic material to the content of the pigment ranges from 1:10 to 1:2 by weight.

5. A process for producing an ink which contains a pigment, and a dispersing agent in an aqueous medium, wherein the pigment, the dispersing agent, and at least one fine particulate white inorganic material selected from the group consisting of fine particulate titanium dioxide and a fine particulate alumina are added simultaneously to the aqueous medium, and treated for dispersion, wherein the ratio of primary particle diameter of the fine particulate white inorganic material to primary diameter of the pigment ranges from 1:10 to 5:1.

6. The process according to claim 5, wherein the ratio of the content of the fine particulate white inorganic material to the content of the pigment ranges from 1:20 to 1:1 by weight.

7. An ink-jet recording method which conducts recording by ejecting ink in a form of droplets, the ink containing a pigment and a dispersing agent in an aqueous medium, and further containing at least one fine particulate white inorganic material selected from the group consisting of fine particulate titanium dioxide and fine particulate alumina.

8. The ink-jet recording method according to claim 7, wherein ink is ejected in a form of droplet by action of a thermal energy given to the ink.

9. A recording unit equipped with an ink container holding an ink therein and a head for ejecting droplets of the ink, said ink being the one set forth in any of claims 1 and 2 to 4.

10. The recording unit according to claim 9 wherein the head ejects the droplets of the ink by action of thermal energy.

11. An ink cartridge equipped with an ink container holding an ink, said ink being the one set forth in any of claims 1 and 2 to 4.

12. An ink-jet recording apparatus equipped with a recording unit having an ink container holding an ink therein and a head for ejecting droplets of the ink, said ink being the one set forth in any of claims 1 and 2 to 4.

13. The ink-jet recording apparatus according to claim 12, wherein the head ejects the droplets of the ink by action of thermal energy.

14. An ink-jet recording apparatus equipped with an ink cartridge having an ink container holding the ink therein, and a recording head for ejecting an ink as droplets, said ink being the one set forth in any of claims 1 and 2 to 4.

15. The ink-jet recording apparatus according to claim 14, wherein the apparatus comprises an ink supplying device for supplying the ink from the ink cartridge to the head.

16. The ink-jet recording apparatus according to claim 14, wherein the head ejects the droplets of the ink by action of thermal energy given to the ink.

* * * * *

UNITED STATES PATENT AND TRADEMARK OFFICE
CERTIFICATE OF CORRECTION

PATENT NO. : 5,439,514

DATED : August 8, 1995

INVENTOR(S) : AKIO KASHIWAZAKI, ET AL.

It is certified that error appears in the above-indentified patent and that said Letters Patent is hereby corrected as shown below:

Title page, column 2, lines 15-16
item[56] References Cited

Foreign Patent Documents,
    "1249869 10/1989 Japan
    1310760 12/1989 Japan" should read
    --1-249869 10/1989 Japan
    1-301760  12/1989 Japan--

Column 5

Line 47 "an" should read --a--; and
    Line 59, "is,preferably" should read --is preferably--.

Column 12

Line 47, "Giving" should read --giving--.

Column 14

Line 16, "droplet" should read --droplets--;
    Line 21, "claims 1 and 2 to 4." should read --claims 1 to 4.--;
    Line 27, "claims 1 and 2 to 4." should read --claims 1 to 4.--;

UNITED STATES PATENT AND TRADEMARK OFFICE
CERTIFICATE OF CORRECTION

PATENT NO. : 5,439,514
DATED : August 8, 1995
INVENTOR(S) : AKIO KASHIWAZAKI, ET AL It is certified that error appears in the above-indentified patent and that said Letters Patent is hereby corrected as shown below:

Column 14

Line 31, "claims 1 and 2 to 4." should read --claims 1 to 4.--; and
Line 39, "1 and 2 to 4." should read --1 to 4.--.

Signed and Sealed this

Twenty-eighth Day of November 1995

Attest:

BRUCE LEHMAN

Attesting Officer    Commissioner of Patents and Trademarks